US007004587B2

(12) United States Patent
Li et al.

(10) Patent No.: US 7,004,587 B2
(45) Date of Patent: Feb. 28, 2006

(54) PROJECTION DISPLAY APPARATUS WITH TWO REFLECTIVE LIGHT PANELS

(75) Inventors: Kuo Yuin Li, Shanhwa (TW); Yen Chen Chen, Shanhwa (TW)

(73) Assignee: Himax Technologies, Inc., (TW)

( * ) Notice: Subject to any disclaimer, the term of this patent is extended or adjusted under 35 U.S.C. 154(b) by 56 days.

(21) Appl. No.: 10/765,178

(22) Filed: Jan. 28, 2004

(65) Prior Publication Data

US 2005/0162614 A1    Jul. 28, 2005

(51) Int. Cl.
*G03B 21/00* (2006.01)
*G03B 21/14* (2006.01)
*G02F 1/1335* (2006.01)

(52) U.S. Cl. .............................. 353/20; 353/31; 353/84; 349/9

(58) Field of Classification Search ................... 353/20, 353/31, 84; 349/5, 8, 9, 18, 30; 359/483, 359/577
See application file for complete search history.

(56) References Cited

U.S. PATENT DOCUMENTS

| 6,183,091 B1 * | 2/2001 | Johnson et al. .............. 353/20 |
| 6,793,344 B1 * | 9/2004 | Kwok et al. .................. 353/84 |
| 2002/0196413 A1 | 12/2002 | Kwok et al. .................. 353/20 |

* cited by examiner

*Primary Examiner*—Melissa J. Koval
(74) *Attorney, Agent, or Firm*—Finnegan, Henderson, Farabow, Garrett & Dunner, L.L.P.

(57) ABSTRACT

A projection display apparatus includes a light source configured to supply light; a polarizing beam splitter for splitting light from the light source into two different polarization state lights; two reflective light panels of which each has a color filter embedded therein and respectively modulates the two polarization state lights so as to simultaneously produce red, green and blue image lights; and a projection lens receiving these color image lights and then projecting them onto a viewing surface so as to form a full-color image.

28 Claims, 4 Drawing Sheets

PROJECTION DISPLAY APPARATUS WITH TWO REFLECTIVE LIGHT PANELS

BACKGROUND OF THE INVENTION

1. Field of the Invention

This invention generally relates to projection display apparatus, and more particularly to a projection display apparatus with two reflective light panels each having a color filter embedded therein.

2. Description of the Related Art

In a projection display system, a liquid crystal display (LCD) panel is used as a modulator for modulating light from a light source so that a projection lens can project the modulated light onto a display screen to form an image. The LCD panel used in such a projection display system mainly includes two types, i.e. a transmissive type and a reflective type.

A reflective type of LCD panel known as a liquid crystal on silicon (LCOS) panel recently receives an attention due to its small size and high resolution and arrangement of reflective LCD elements on a silicon backplane. LCoS panels have a number of significant advantages over other types of reflective LCD panels. For example, crystalline silicon can be used to form active matrix elements of the LCoS panels. The silicon backplane can also be used to form the TFT drivers and other functional circuitry, using well-known and efficient semiconductor manufacturing techniques. Moreover, a larger percentage of the active area can be used for processing video information for display.

In an LCoS projection display system, a single-panel projector and a three-panel projector has been used to achieve a full color. To achieve full color using a white light source, color management systems are needed for partitioning the spectrum into red, green, and blue, either temporally or spatially. In temporal or time sequential color management systems, only a single LCoS panel is needed for producing a full color by sequential colors. In spatial or multi-path color management systems, three LCoS panels are needed and respectively used for each of the primary colors.

For the single-panel systems, overall system cost and size can be small but there exists a color break-up problem. For the three-panel systems, the optical architecture can easily deliver the high lumen output required for large area projection displays but is complex. Therefore, a two-panel system is used so as to overcome the disadvantages in above-mentioned systems. In addition, the two-panel system incorporates the attractive aspects of above-mentioned systems, including high optical throughput and a small size and cost close to these of the single-panel system.

Referring to FIG. 1, it shows a schematic view of a conventional projection display apparatus 100. The projection display apparatus 100 comprises a white light source 102 configured to supply light 103, a first clean-up polarizer. 104, a color switch 106, a polarizating beam splitter 108, a reflective panel 110, and a projection lens 112. The color switch 106 is an electronically switchable spectral filter for generating a red, green, and blue color light 114 sequentially. The polarizating beam splitter 108 receives the single color light 114 and then reflects the single color light 114 to the reflective panel 110. The reflective panel 110 modulates the single color light 114 for changing the polarity of the single light 114 and reflects the modulated single color light 114 so as to pass through the polarizating beam splitter 108. The projection lens 112 receives the modulated single color light 114 from the polarizating beam splitter 108 and then projects the modulated single color light 114.

However, the aforementioned projection display apparatus 100 must project red, green, blue colors sequentially so as to form a full color image: Therefore, the circuit designs are complicated and synchronization is difficult between the color switch 106 and the reflective panel 114. Besides, the use of the color switch 106 and its related circuits increase the overall cost of the projection display apparatus 100.

Accordingly, the present invention provides a novel two-panel projection display apparatus having simple controlled circuits and lower manufacturing cost.

SUMMARY OF THE INVENTION

It is an object of the present invention to provide a two-panel projection display apparatus having simple controlled circuits and lower manufacturing cost.

In order to achieve the above object, the present invention provides a projection display apparatus including a light source configured to supply light; a polarizing beam splitter for splitting light from the light source into two different polarization lights; two reflective light panels each having a color filter embedded therein and respectively modulates the two polarization lights so as to simultaneously generate red, green and blue image lights; and a projection lens receiving these color image lights and then projecting them onto a viewing surface so as to form a full-color image.

According to one aspect of the present invention, the two reflective light panels used in the projection display apparatus respectively have a single-color and a two-color filters embedded therein for producing red, green and blue image lights simultaneously so as to achieve a full color image.

According to the other aspect of the present invention, the projection display apparatus can achieve a fill color image by utilizing fewer electronic and optical elements so as to reduce the overall cost.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
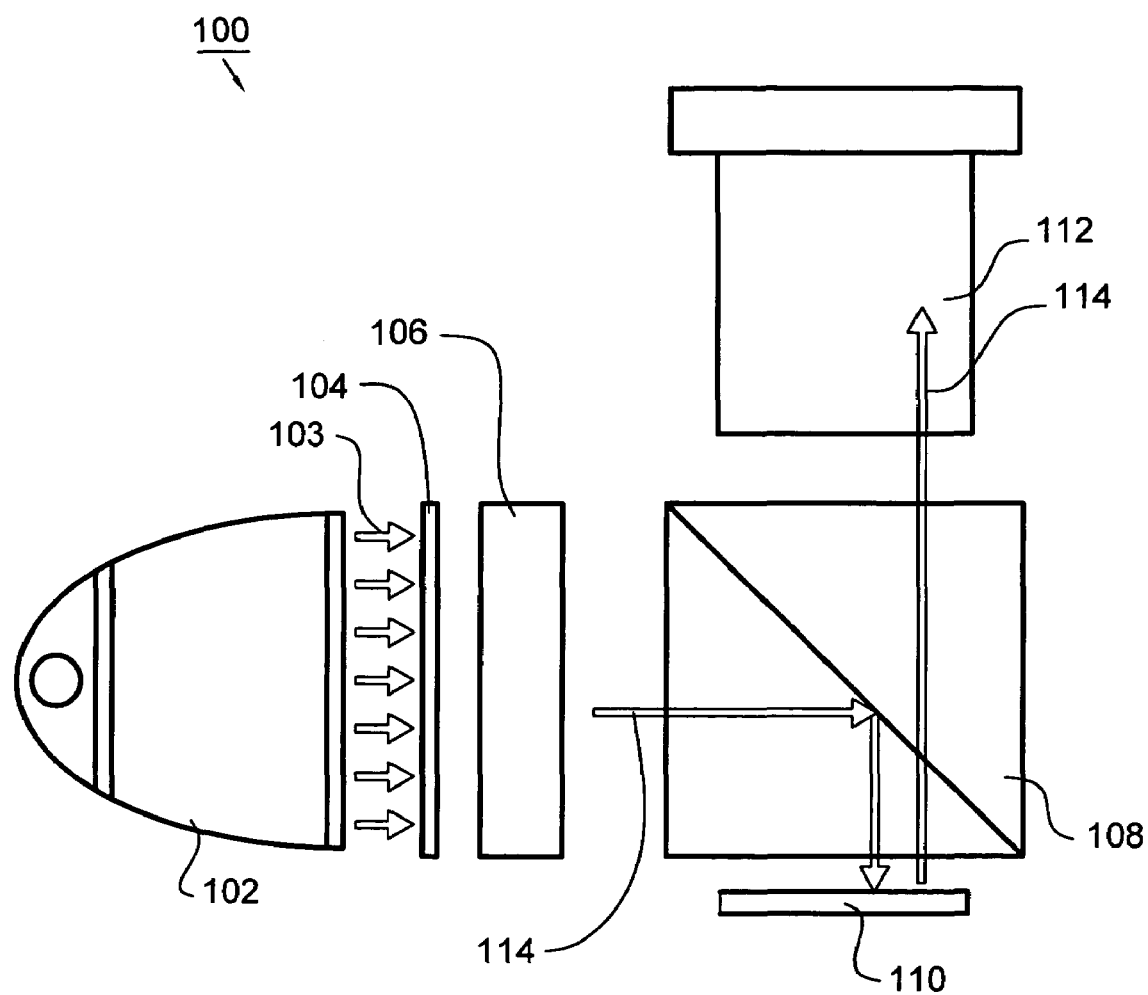
FIG. 1 is a schematic view of a conventional projection display apparatus with two LCoS panels.
Figure 2:
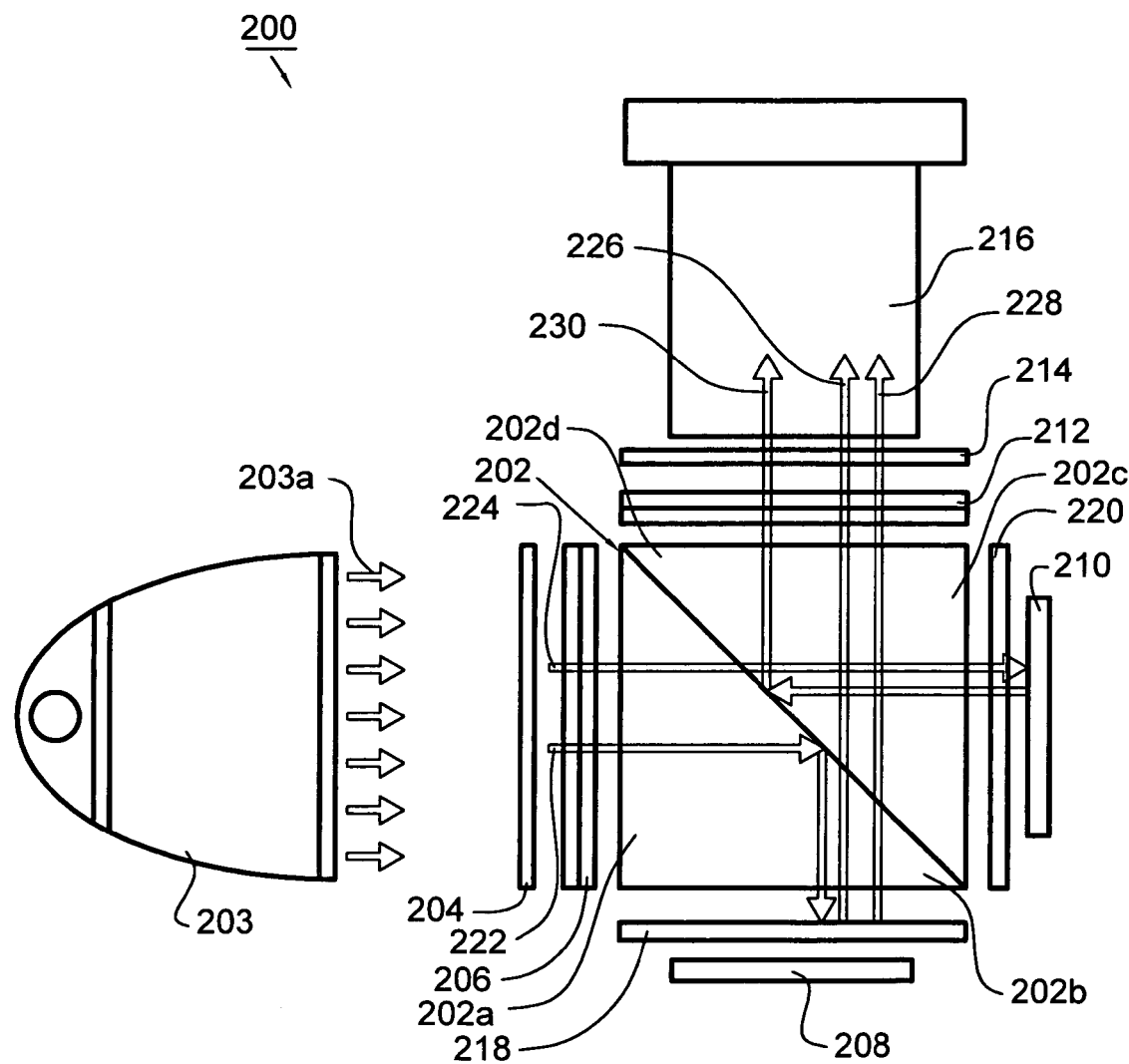
FIG. 2 is a schematic view of a projection display apparatus with two reflective light panels according to one embodiment of the present invention.

Now referring to FIG. 2, it shows a schematic view of a projection display apparatus 200 with two reflective light panels according to one embodiment of the present invention. The projection display apparatus 200 comprises a polarizating beam splitter 202 which reflects S-polarization light in a transverse direction and which allows P-polarization light to pass directly therethrough. The polarizating beam splitter 202 has a light input side 202a, a first split-light side 202b adjacent to the light input side 202a orthogonally, a second split-light side 202c opposite to the light input side 202a and a light output side 202d opposite to the first split-light side 202b. A light source 203 is configured to supply white light 203a toward the polarizating beam splitter 202. A P-state polarizer 204 is disposed adjacent to the light input side 202a, allows P-polarization light to pass directly therethrough, and absorbs S-polarization light. A first Green/Magenta color selector 206 is disposed between the P-state polarizer 204 and the light input side 202a, and converts the polarization state of magenta light that passes therethrough. A first reflective light panel 208 is disposed adjacent to the first split-light side 202b while a second reflective light panel 210 is disposed adjacent to the second split-light side 202c. A second Green/Magenta color selector 212 is disposed adjacent to the light output side 202d. An S-state polarizer 214 is disposed adjacent to one side of the second Green/Magenta color selector 212 opposite to the light output side 202d, and prevents P-polarization light from passing therethrough. A projection lens 216 receives light that passes through the S-state polarizer 214. When the first and second reflective light panels 208, 210 are in a display state, they modulate and convert the polarization state of light that is incident thereon, and reflect the modulated light in an opposite direction. In the following paragraphs, the operation of the projection display apparatus 200 of the present invention will be described in greater detail with the first and second reflective light panels 208, 210 in the display state. In addition, each of a pair of quarter wavelength plates 218, 220 is disposed between the polarizating beam splitter 202 and a respective one of the first and second reflective light panels 208, 210 for enhancing the image contrast quality.

Figure 3:
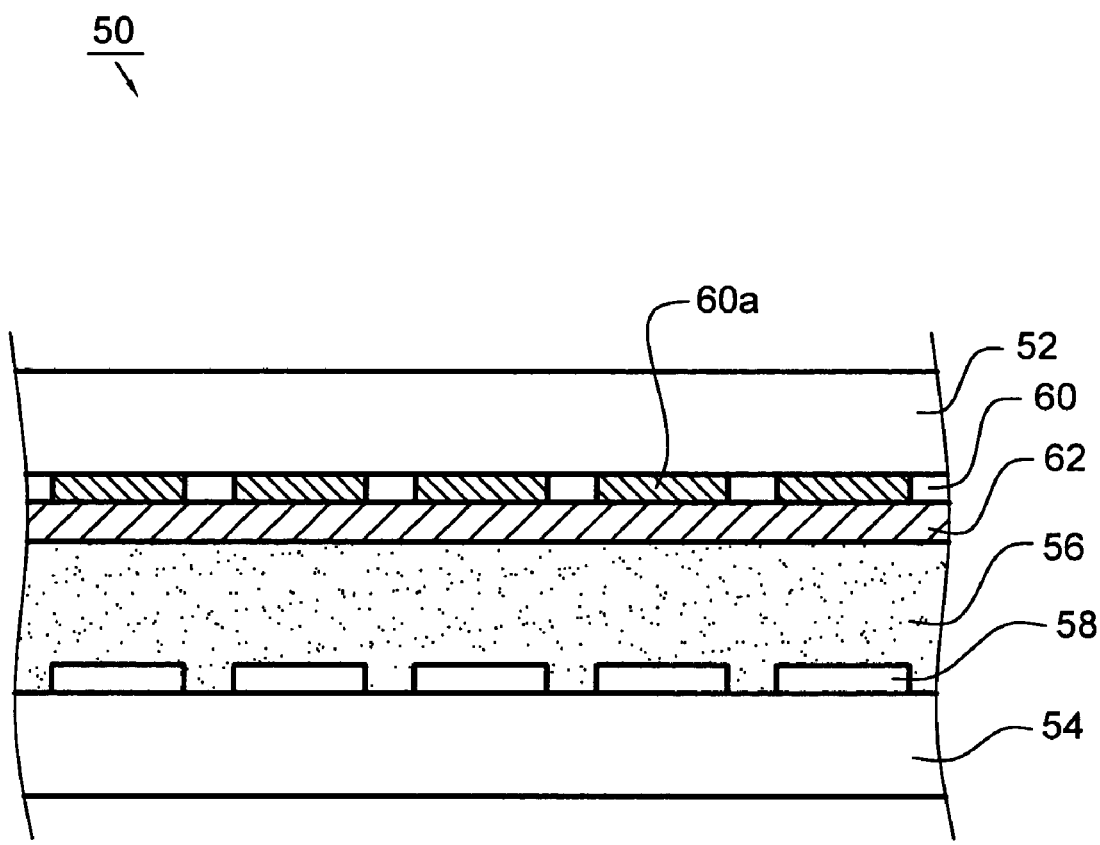
FIG. 3 is a cross-sectional view of a LCoS panel having a color filter embedded therein according to the present invention.

According to the projection display apparatus of the present invention, the first and second reflective light panels 208, 210 are preferably LCoS panels each having a color filter embedded therein. FIG. 3 shows a cross-sectional view of an LCoS panel 50 according to the projection display apparatus of the present invention. The LCoS panel 50 comprises a glass substrate 52, a silicon backplane 54 and an LC layer 56 disposed therebetween. The silicon backplane 54 has a plurality of electrodes 58 disposed thereon, and the glass substrate 52 has a color filter 60 and an ITO layer 62 disposed thereon, wherein the color filter 60 is disposed between the glass substrate 52 and the ITO layer 62. The color filter 60 comprises a plurality of color sub-pixels 60a for filtering color light therethrough. For this embodiment, the color filter embedded in the first reflective light panel 208 is a red-blue color filter comprising red and blue sub-pixels, and that embedded in the second reflective light panel 210 is a green color filter only comprising green sub-pixels.

Each of the first and second Green/Magenta color selector 206, 212, such as the ColorSelect filter products commercially available from ColorLink Co., is used to convert the polarization state of a predetermined color component. In this preferred embodiment, the first Green/Magenta color selector 206 is used to convert P-polarization magenta light that passes therethrough into S-polarization magenta light and to allow green light to pass therethrough. The second Green/Magenta color selector 212 is used for converting the polarization states of the P-polarization blue and red lights (magenta light) that pass therethrough into S-polarization and allowing green light to pass therethrough.

When white light 203a is provided to the P-state polarizer 204, only P-polarization white light passes therethrough and reaches the first Green/Magenta color selector 206. The first Green/Magenta color selector 206 separates the P-polarization white light into S-polarization magenta light 222 and P-polarization green light 224. When the polarizating beam splitter 202 receives the S-polarization magenta light 222 and the P-polarization green light 224 from the first Green/Magenta color selector 206, it reflects the S-polarization magenta light 222 toward the first reflective light panel 208 and allow the P-polarization green light 224 to pass directly therethrough. The S-polarization magenta light 222 and the P-polarization green light 224, then, respectively reach the first reflective light panel 208 and the second reflective light panel 210.

When the first and second reflective light panels 208, 210 are in the display state, the S-polarization magenta light 222 is modulated by the first reflective light panel 208, and the polarization state of the magenta light 222 is changed to P-polarization. The P-polarization magenta light 222 is then reflected by the first reflective light panel 208 and passes through the red-blue color filter embedded in the first reflective light panel 208 so as to generate P-polarization red image light 226 and P-polarization blue image light 228. The P-polarization red image light 226 and P-polarization blue image light 228 then pass directly through the polarizating beam splitter 202 so as to reach the second Green/Magenta color selector 212. The second Green/Magenta color selector 212 converts the polarization states of both the P-polarization red image light 226 and the P-polarization blue image light 228 to S-polarization, and then the S-polarization red image light 226 and blue image light 228 pass through the S-state polarizer 214 and reach the projection lens 216 for being projecting on a projection screen (not shown). On the other hand, the P-polarization green light 224 is modulated by the second reflective light panel 210, and the polarization state of the P-polarization green light 224 is changed to S-polarization. The S-polarization green light 224 then is reflected by the second reflective light panel 210 and pass through the green color filter embedded in the second reflective light panel 210 so as to generate S-polarization green image light 230. The S-polarization green image light 230 is then transmitted toward the polarizating beam splitter 202 and further reflected by the polarizating beam splitter 202 to pass in sequence through the second Green/Magenta color selector 212, the S-state polarizer 214 and finally reach the projection lens 216. When the green image light 230 is projected by the projection lens 216, it cooperates with the red image light 226 and blue image light 228 so as to form a full color image on the projection screen (not shown).

Figure 4:
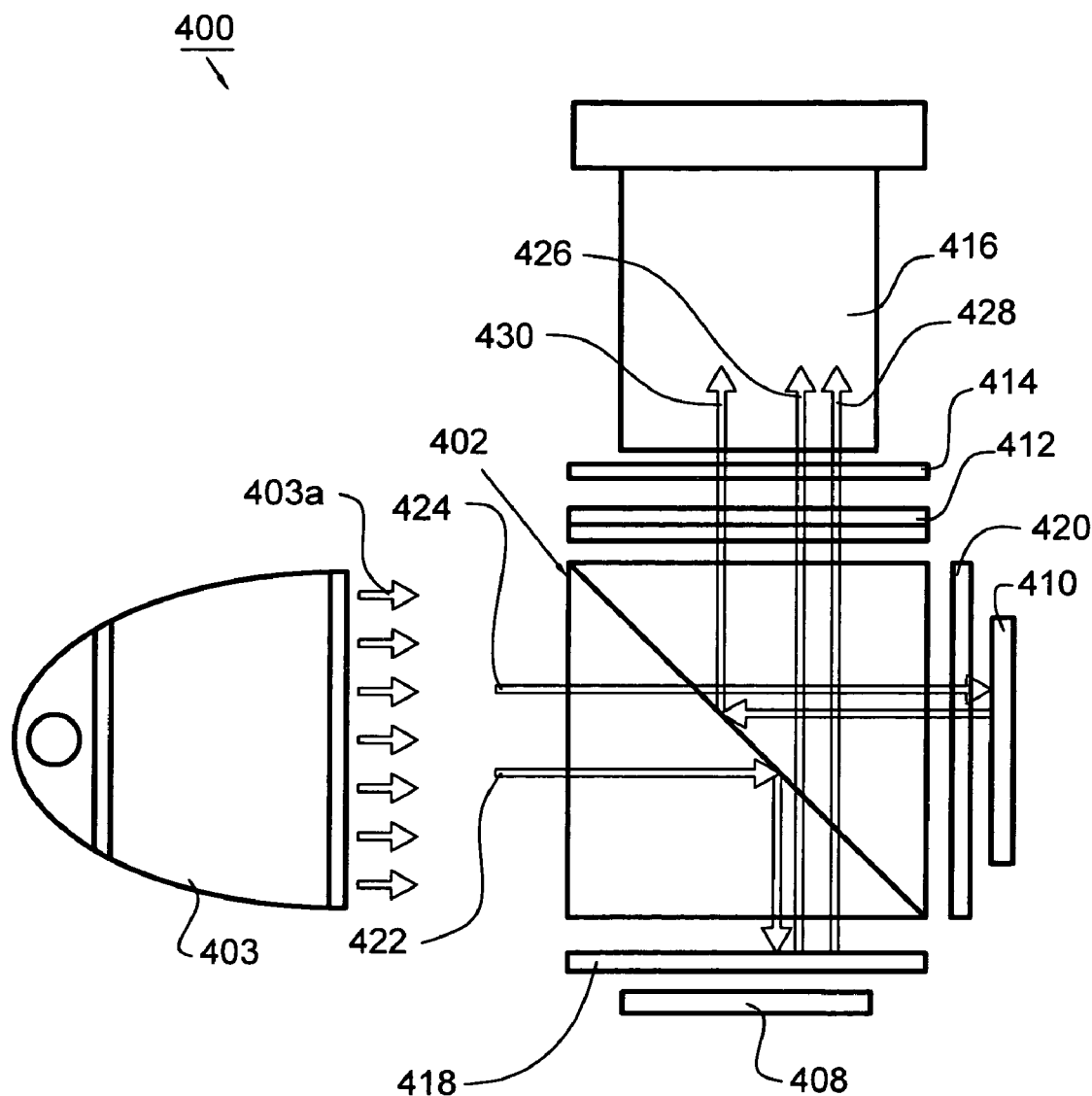
FIG. 4 is a schematic view of a projection display apparatus with two reflective light panels according to another embodiment of the present invention.

Now referring to FIG. 4, it shows a schematic view of a projection display apparatus 400 with two reflected light panels according to another embodiment of the present invention. Unlike the projection display apparatus 200, the projection display apparatus 400 can achieve a full color image without the P-state polarizer 204 and the first Green/Magenta color selector 206 used in the projection display apparatus 200.

The projection display apparatus 400 similarly comprises a polarizating beam splitter 402, a light source 403, a first reflective light panel 408, a second reflective light panel 410, a Green/Magenta color selector 412, a S-state polarizer 414, a projection lens 416, a first quarter wavelength plates 418 and a second quarter wavelength plates 420.

Similarly, the first and second reflective light panels 408, 410 are preferably LCoS panels each having a color filter embedded therein, and the color filter embedded in the first reflective light panel 408 is a red-blue color filter and that embedded in the second reflective light panel 410 is a green color filter.

When the light source 403 supplies unpolarized white light 403a, including at least S-polarization white light 422 and P-polarization white light 424, to the polarizating beam splitter 402, the polarizating beam splitter 402 reflects the S-polarization white light 422 toward the first reflective light panel 408 and allows the P-polarization white light 424 to pass directly therethrough. The S-polarization white light 422 and the P-polarization white light 424, then, respectively reach the first reflective light panel 408 and the second reflective light panel 410.

When the first and second reflective light panels 408, 410 are in the display state, the S-polarization white light 422 is modulated by the first reflective light panel 408, and the polarization state of the S-polarization white light 422 is changed to P-polarization. The P-polarization white light 422 is then reflected by the first reflective light panel 408 and passes through the red-blue color filter embedded in the first reflective light panel 408 so as to generate P-polarization red image light 426 and P-polarization blue image light 428. The P-polarization red image light 426 and P-polarization blue image light 428 then pass directly through the polarizating beam splitter 402 so as to reach the second Green/Magenta color selector 412. The second Green/Magenta color selector 412 converts the polarization states of both the P-polarization red image light 426 and the P-polarization blue image light 428 to S-polarization, and then the S-polarization red image light 426 and blue image light 428 pass through the S-state polarizer 414 and reach the projection lens 416 for being projecting on a projection screen (not shown). On the other hand, the P-polarization white light 424 is modulated by the second reflective light panel 410, and the polarization state of the P-polarization white light 424 is changed to S-polarization. The S-polarization white light 424 then is reflected by the second reflective light panel 410 and pass through the green color filter embedded in the second reflective light panel 410 so as to generate S-polarization green light image 430. The S-polarization green image light 430 is then transmitted toward the polarizating beam splitter 402 and further reflected by the polarizating beam splitter 402 to pass in sequence through the second Green/Magenta color selector 412, the S-state polarizer 414 and finally reach the projection lens 416. When the green image light 430 is projected by the projection lens 416, it cooperates with the red image light 426 and blue image light 428 so as to form a full color image on the projection screen (not shown).

According to the projection display apparatus 400 of the present invention, the white light 403a applied to the polarizating beam splitter 402 can be unpolarized such that optical elements used for polarizing the white light 403a are eliminated, and therefore the overall cost of the projection display apparatus 400 can be reduced. In addition, the light source 403 can supply white light mixed with some blue or red while the size of each red sub-pixel and that of each blue sub-pixel on the red-blue color filter are proportionally designed. For example, if the light source 403 supplies white light mixed with some blue, the size of each blue sub-pixel is designed to be smaller than that of each red sub-pixel so as to generate balanced blue image light and red image light.

It should be noted that the red-blue color filter and the green color filter respectively embedded in the reflective light panel 408, 410 can be alternatively substituted by a blue-green color filter and a red color filter, or a green-red color filter and a blue color filter, such that red, blue and green image lights can be generated by the reflective light panel 408, 410 simultaneously and projected by the projection lens 416 to form a full color image.

While the foregoing descriptions and drawings represent the preferred embodiments of the present invention, it should be understood that various additions, modifications and substitutions may be made therein without departing from the spirit and scope of the principles of the present invention as defined in the accompanying claims. One skilled in the art will appreciate that the invention may be used with many modifications of form, structure, arrangement, elements, and components. The presently disclosed embodiments are therefore to be considered in all respects as illustrative and not restrictive, and the scope of the invention should be defined by the appended claims and their legal equivalents, not limited to the foregoing descriptions.

What is claimed is:

1. A two-panel display apparatus, comprising:
   a light source supplying a first polarized light and a second polarized light;
   a polarizing beam splitter separating the first polarized light and the second polarized light into two directions;
   a first reflective light panel having a first color filter embedded therein, the first reflective light panel receiving the first polarized light from the polarizing beam splitter and reflecting a first image light;
   a first quarter wavelength plate disposed between the polarizing beam splitter and the first reflective light panel;
   a second reflective light panel receiving the second polarized light from the polarizing beam splitter and reflecting a second image light;
   a second quarter wavelength plate disposed between the polarizing beam splitter and the second reflective light panel;
   a first color selector converting the first image light and the second image light into the same polarization states; and
   a projection lens receiving and projecting the combined first and second image light from the first color selector.

2. The projection display apparatus as claimed in claim 1, wherein the directions of the first and second polarized light are orthogonal.

3. The projection display apparatus as claimed in claim 1 further comprising a first polarizer disposed between the first color selector and the projection lens.

4. The projection display apparatus as claimed in claim 1, wherein the first and second reflective light panels are LCoS panels.

5. The projection display apparatus as claimed in claim 1, wherein the first color filter is a single-color filter.

6. The projection display apparatus as claimed in claim 5, wherein the single-color filter is selected from a group of red, green and blue colors.

7. The projection display apparatus as claimed in claim 1, wherein the first color filter is a two-color filter.

8. The projection display apparatus as claimed in claim 7, wherein the two-color filter is selected from a group of red, green and blue colors.

9. The projection display apparatus as claimed in claim 1, wherein the second reflective light panels has a second color filter embedded therein.

10. A projection display apparatus, comprising:
    a light source supplying a first polarized light and a second polarized light;
    a polarizing beam splitter separating the first polarized light and the second polarized light into two directions;

a first reflective light panel having a first color filter embedded therein, the first reflective light panel receiving the first polarized light from the polarizing beam splitter and reflecting a first image light;

a second reflective light panel receiving the second polarized light from the polarizing beam splitter and reflecting a second image light;

a first quarter wavelength plate disposed between the polarizing beam splitter and the first reflective light panel;

a second quarter wavelength plate disposed between the polarizing beam splitter and the second reflective light panel; and a projection lens receiving and projecting the combined first and second image.

11. The projection display apparatus as claimed in claim 10, wherein the directions of the first and second polarized light are orthogonal.

12. The projection display apparatus as claimed in claim 10, further comprising a first polarizer disposed between the polarizing the beam splitter and the projection lens.

13. The projection display apparatus as claimed in claim 10, wherein the first and second reflective light panels are LCoS panels.

14. The projection display apparatus as claimed in claim 10, wherein the first color filter is a single-color filter.

15. The projection display apparatus as claimed in claim 14, wherein the single-color filter is selected from a group of red, green and blue colors.

16. The projection display apparatus as claimed in claim 10, wherein the first color filter is a two-color filter.

17. The projection display apparatus as claimed in claim 16, wherein the two-color filter is selected from a group of red, green and blue colors.

18. The projection display apparatus as claimed in claim 10, wherein the second reflective light panels has a second color filter embedded therein.

19. A projection display apparatus, comprising:

a light source supplying a first polarized light and a second polarized light;

a polarizing beam splitter separating the first polarized light and the second polarized light into two directions;

a first reflective light panel having a first color filter embedded therein, the first reflective light panel receiving the first polarized light from the polarizing beam splitter and reflecting a first image light;

a second reflective light panel receiving the second polarized light from the polarizing beam splitter and reflecting a second image light;

a first color selector converting the first image light and the second image light into the same polarization states;

a projection lens receiving and projecting the combined first and second image light from the first color selector; and a first polarizer disposed between the first color selector and the projection lens.

20. The projection display apparatus as claimed in claim 19, wherein the directions of the first and second polarized light are orthogonal.

21. The projection display apparatus as claimed in claim 19, further comprising:

a first quarter wavelength plate disposed between the polarizing beam splitter and the first reflective light panel; and a second quarter wavelength plate disposed between the polarizing beam splitter and the second reflective light panel.

22. The projection display apparatus as claimed in claim 19, wherein the first and second reflective light panels are LCoS panels.

23. The projection display apparatus as claimed in claim 19, wherein the first color filter is a single-color filter.

24. The projection display apparatus as claimed in claim 19, wherein the first color filter is a two-color filter.

25. A projection display apparatus, comprising:

means for supplying a first polarized light and a second polarized light;

means for separating the first polarized light and the second polarized light into two directions;

a first reflective light panel for receiving the first polarized light from the separating means and reflecting a first image light;

a second reflective light panel for receiving the second polarized light from the separating means and reflecting a second image light;

means for converting the first image light and the second image light into the same polarization states;

a projection lens receiving and projecting the combined first and second image light from the converting means; and a first polarizer disposed between the converting means and the projection lens.

26. The projection display apparatus as claimed in claim 25, wherein the directions of the first and second polarized light are orthogonal.

27. The projection display apparatus as claimed in claim 25, further comprising:

a first quarter wavelength plate disposed between the separating means and the first reflective light panel; and a second quarter wavelength plate disposed between the separating means and the second reflective light panel.

28. The projection display apparatus as claimed in claim 25, wherein the first and second reflective light panels are LCoS panels.

* * * * *